United States Patent [19]

Kishi et al.

[11] 4,442,985
[45] Apr. 17, 1984

[54] APPARATUS FOR CONTROLLING A WEB TRANSPORT SYSTEM

[75] Inventors: Yoshio Kishi, Yokohama; Norichika Mine, Kanagawa, both of Japan

[73] Assignee: Sony Corporation, Tokyo, Japan

[21] Appl. No.: 355,158

[22] Filed: Mar. 5, 1982

[30] Foreign Application Priority Data

Apr. 6, 1981 [JP] Japan .................................. 56-51331

[51] Int. Cl.³ .................... B65H 77/00; G11B 15/28; G11B 15/32; G11B 15/43
[52] U.S. Cl. ................................. 242/186; 242/75.51; 242/203; 242/207; 318/7; 360/73
[58] Field of Search ............ 242/186, 189, 190, 75.51, 242/206, 207, 208, 209, 210, 75.5, 75.52, 188, 202, 203; 360/73, 74.3; 318/318, 6, 7; 226/174, 178, 188

[56] References Cited

U.S. PATENT DOCUMENTS

| | | | |
|---|---|---|---|
| 3,604,992 | 9/1971 | Audeh et al. ........................ | 318/7 X |
| 3,809,335 | 5/1974 | Mantey ................................ | 242/186 |
| 3,834,648 | 9/1974 | Rose, Jr. et al. ............. | 242/75.51 X |
| 3,910,527 | 10/1975 | Buhler et al. ....................... | 242/186 |
| 4,172,231 | 10/1979 | d'Alayer de Costemore d'Arc et al. .................................. | 318/7 |
| 4,213,583 | 7/1980 | Mitani et al. ........................ | 318/6 X |
| 4,232,257 | 11/1980 | Harshberger, Jr. ............... | 360/73 X |
| 4,355,750 | 10/1982 | Saitou et al. ........................ | 226/188 |

Primary Examiner—John M. Jillions
Assistant Examiner—Scott J. Haugland
Attorney, Agent, or Firm—Lewis H. Eslinger; Alvin Sinderbrand

[57] ABSTRACT

Apparatus is provided for controlling a web transport system, such as a tape transport, of the type having supply and take-up reels for supplying and taking up the web, respectively, a tension control circuit for controlling the supply and take-up tension of the web, a web drive, such as a capstan, and a sensor for sensing the movement of the web as it is driven. The control apparatus includes a web drive detector for detecting the operation of the web drive and, particularly, the speed at which the web drive is driven. A comparator coupled to the sensor and the web drive detector compares the actual speed at which the web moves and the speed at which the web drive is driven to indicate when the speed at which the web moves differs from the speed at which the web drive is driven, such as when the web slips with respect to the web drive. An adjusting circuit coupled to the comparator adjusts the tension control circuit when the web speed differs from the web drive speed.

25 Claims, 25 Drawing Figures

SMALL DUTY    LARGE DUTY 2.5V
0V

0V
$-\alpha$

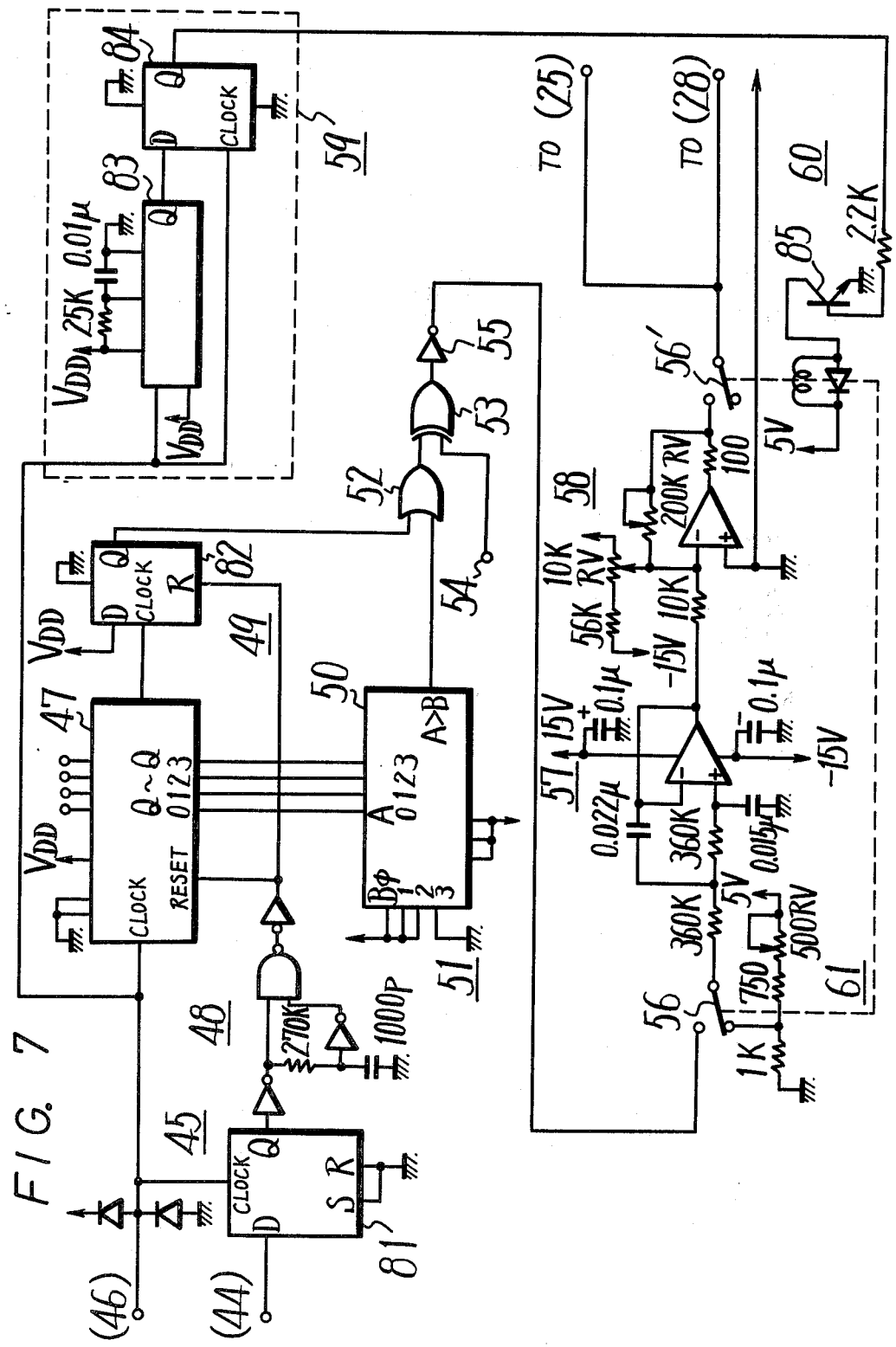
F I G. 7

APPARATUS FOR CONTROLLING A WEB TRANSPORT SYSTEM

BACKGROUND OF THE INVENTION

This invention relates to a web transport arrangement, such as a tape transport system, and more particularly, to apparatus for controlling the tension in such a system in response to the detection of slip, thereby eliminating slip so that the web is transported at a substantially constant, desired speed.

Web transport systems are known wherein a web of material, such as a magnetic tape, a paper tape, a film, or the like, is transported between supply and take-up reels. In tape transport systems, for example, such as magnetic tape transports, information, such as audio information, is recorded on or reproduced from the tape as it is moved between the supply and take-up reels. Typically, audio signal recording/reproducing systems are provided with a capstan and pinch roller to engage the magnetic tape therebetween; and the rotation of the capstan serves to drive the tape in either the forward or reverse direction. As the tape is transported, audio signals are recorded thereon; or previously recorded signals are reproduced therefrom. The tape used in a conventional analog audio signal recording/reproducing system is transported at a relatively slow rate which, for example, is no greater than about seven inches per second.

Recently, digital audio signal recorders have been developed wherein an analog audio signal first is converted to digital form and then the digitized audio signal, which may be a pulse code modulated (PCM) signal, is recorded on the magnetic tape. Original audio sounds may be recorded and reproduced with higher fidelity when digital recording techniques are used than when analog recording techniques are adopted. However, the speed at which the magnetic tape is transported for digital recording/reproduction is far greater than the tape speed for analog recording/reproduction. For example, in a digital audio signal recording/reproducing system, the tape is transported at a speed on the order of about 76 cm./sec. At these and higher tape transport speeds, the conventional tape drive mechanism used in an analog recorder exhibits less than acceptable results. That is, at the relatively high tape transport speeds employed in a digital audio signal recorder/reproducer, the combination of a capstan and pinch roller to engage and drive the tape is not satisfactory.

It has been proposed in, for example, U.S. Pat. No. 4,232,257, to employ a capstan of relatively large diameter, without a pinch roller, to transport the magnetic tape at the necessarily high transport speeds for digital audio signal recording/reproducing techniques. The tape is maintained with appropriate tension against the capstan by selectively controlling the rotation of the supply and take-up reels with separate supply reel and take-up reel drive motors. Furthermore, guide rollers are provided to insure that the tape is wrapped about a sufficient peripheral portion of the capstan such that the friction between the tape and the capstan is adequate to drive the tape at the desired speed. Tape take-up tension between the capstan and the take-up reel is sensed; and the take-up reel drive motor is controlled as a function of this sensed tape take-up tension. Similarly, tape supply tension between the capstan and the supply reel is detected; and the supply reel drive motor is controlled as a function of this sensed tape supply tension. Consequently, the supply and take-up reels may be driven independently of each other, and at different speeds, so as to maintain proper tension in the tape. This, in turn, provides the appropriate friction between the tape and the capstan such that the tape may be driven by the capstan alone at the desired, high speed.

However, in tape transport systems of the type just described, the tape take-up and supply tensions must be maintained in proper balance. If, for example, the tape take-up tension is reduced relative to the tape supply tension, a slackening of the tape across the surface of the capstan may result. This slackening of the tape against the capstan may produce an air film therebetween, resulting in slippage between the tape and the capstan. Once formed, this air film is difficult, if not impossible, to remove without changing the speed at which the tape is driven. Hence, the formation of the air film not only introduces tape slip but, because of the inherent nature of the tape transport system, acts to maintain that tape slip so as to oppose the recovery of the normal tape transport speed.

OBJECTS OF THE INVENTION

Therefore, it is an object of the present invention to provide improved apparatus for controlling a web transport system, such as a tape transport system, which overcomes the aforenoted disadvantages.

Another object of this invention is to provide a tape tension control apparatus for avoiding slip between a tape and a tape-drive capstan.

A still further object of this invention is to provide apparatus for selectively controlling tape take-up and supply tensions in a tape transport system, wherein tape slippage is detected and compensated.

An additional object of this invention is to provide apparatus for controlling the tension in a web transport system having supply and take-up reels, wherein such reels are selectively driven in a manner to maintain proper tension in the web and thereby avoid, or at least minimize, slippage between the web and a web-drive capstan.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for controlling a web transport system of the type having supply and take-up reels for supplying and taking up the web, respectively, a tension control circuit for controlling the supply and take-up tension of the web, and a web drive which operates to move the web. A sensor senses the actual speed at which the web moves, and a web drive detector detects the speed at which the web drive is driven. A comparator coupled to the sensor and web drive detector compares the web speed with the web drive speed to indicate when the ratio between these speeds differs from a predetermined amount. The tension control circuit is adjusted as a function of this detected difference, whereby slippage between the web and the web drive is removed so as to bring the speed of the web into proper proporation with the speed of the web drive.

BRIEF DESCRIPTION OF THE DRAWINGS

The following detailed description, given by way of example, will best be understood in conjuction with the accompanying drawings wherein:

FIGS. 3A-3H are waveform diagrams which are useful in understanding the operation of the embodiment shown in FIG. 2.;

FIG. 7 is a schematic diagram of a practical implementation of the embodiment shown in FIG. 2.

DETAILED DESCRIPTION OF CERTAIN PREFERRED EMBODIMENTS

Figure 1:
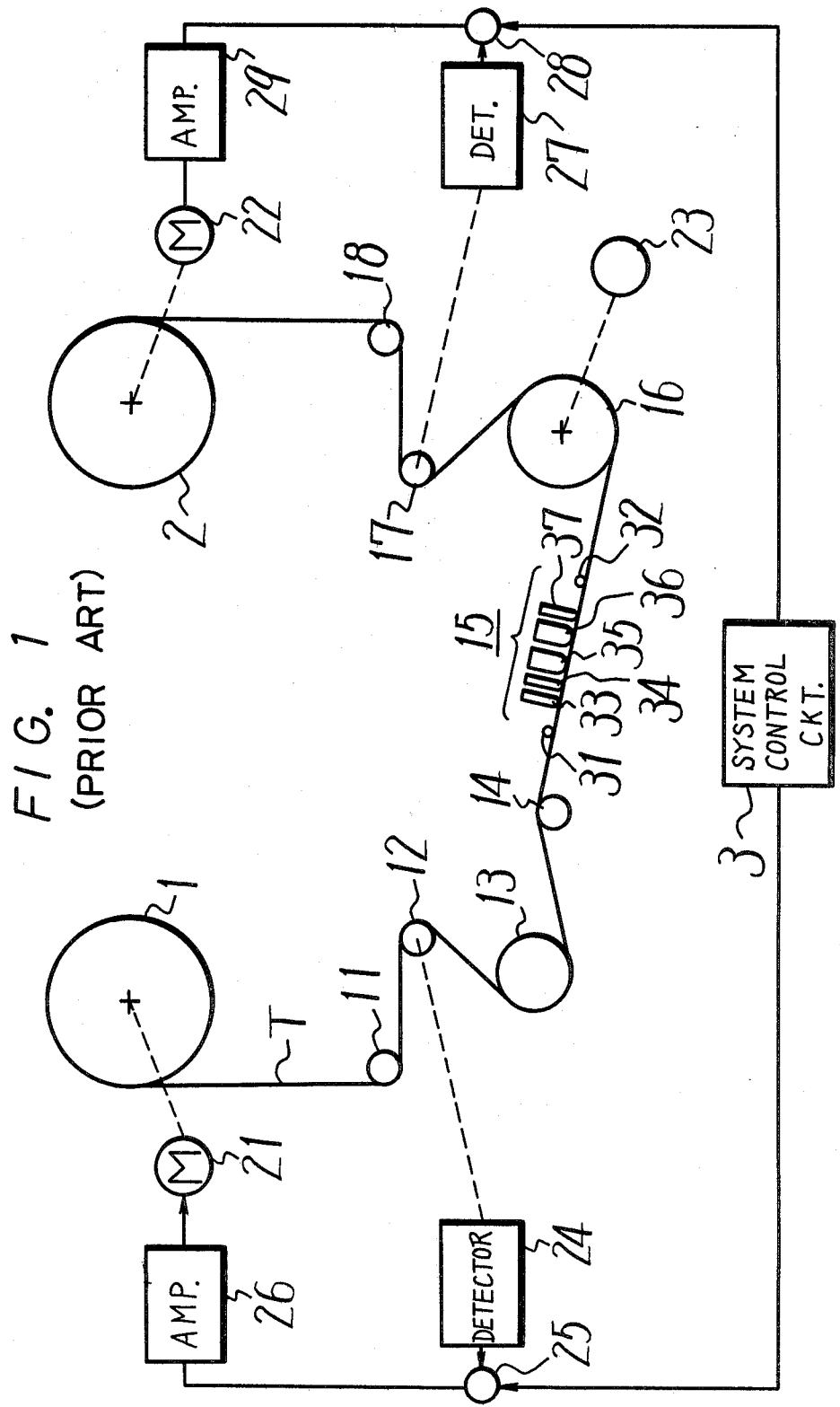
FIG. 1 is a schematic representation of a web transport system in which the present invention finds ready application.

Before describing one embodiment of the present invention, reference is made to a typical web transport system in which this invention finds ready application. The web transport system may be adapted to bi-directionally drive a web between supply and take-up reels. The web may be a magnetic tape, a paper tape, a film, or other conventional web of material. In the interest of simplification, and for ease of understanding, it is assumed that the web is a magnetic tape T, as shown in FIG. 1. Furthermore, the web transport system, referred to hereinafter as a tape transport system, is adapted to bi-directionally transport tape T past a record/reproduce station 15 whereat information is recorded on or reproduced from the tape. In a preferred embodiment, station 15 is adapted to record and/or reproduce digitized audio signals, such as PCM-encoded audio signals. It will be appreciated, therefore, that the illustrated tape transport system may be provided in a so-called PCM recorder.

The tape transport system illustrated in FIG. 1 is comprised of supply reel 1 and take-up reel 2, between which tape T is bi-directionally driven. Tape T is deployed about a guide roller 11, a roller 12 which is used to provide an indication of the tension of the tape engaged therewith, rollers 13 and 14, a capstan 16, a roller 17 which, like roller 12, is used to provide an indication of the tension of the tape engaged therewith, and a guide roller 18. It will be appreciated that, the greater the tension of tape T engaged with roller 12, the more accurately this roller rotates due to its frictional engagement with the tape. Likewise, the greater the tension between the tape and roller 17, the more accurately the roller rotates as a result of its friction with the tape. Hence, with proper tape tension, rollers 12 and 17 rotate at predetermined, respective rates. Any deviation between the rates of rotation of rollers 12 and 17 and such predetermined rates is an indication of a corrresponding deviation in the respective supply and take-up tension.

Station 15 is disposed between roller 13 and capstan 16. A pair of guide pins 31 and 32, disposed at opposite sides of station 15, serve to guide tape T past this station. Station 15 is provided with a magnetic head assembly for the purpose of recording and reproducing digitized audio signals on tape T. As an example, the head assembly includes a PCM recording head 33, a PCM reproducing head 34, an analog erasing head 35, an analog record/reproduce head 36 and a PCM recording head 37, all disposed in the illustrated order when tape T is transported from supply reel 1 to take-up reel 2. These heads operate in a manner known to those of ordinary skill in the art for recording and reproducing PCM audio signals, as well as for recording and reproducing analog signals on tape T.

Capstan 16 is driven by a capstan drive motor 23 at a substantially constant, predetermined angular velocity. Rollers 11 and 18, as well as rollers 12 and 17, function to impart sufficient tension to tape T such that the friction between the tape and the peripheral surface of capstan 16 is adequate to transport the tape without the additional use of a pinch roller.

As mentioned above, the rate at which rollers 12 and 17 rotate is an indication of the tape supply tension and the tape take-up tension. In the present description, the tape supply tension refers to the tension of tape T between supply reel 1 and capstan 16; and tape take-up tension refers to the tension of tape T between capstan 16 and take-up reel 2. Roller 12 is coupled to a detector 24 which is responsive to the angular velocity at which roller 12 rotates to produce a signal representative of this angular velocity and, thus, representative of the tape supply tension. Similarly, roller 17 is coupled to a detector 27 which is responsive to the angular velocity at which roller 17 rotates to produce a corresponding signal representative of the tape take-up tension. It is appreciated that any deviation in the supply or take-up tensions is reflected in a corresponding deviation in the angular velocities of rollers 12 and 17 which, in turn, results in corresponding deviations in the signals produced by detectors 24 and 27. These signals are referred to as tension signals; and indicate the respective tape supply and tape take-up tensions. As an example, roller 12 (and also roller 17) may be mechanically coupled to a so-called frequency generator which generates a signal whose frequency is a function of the angular velocity of the roller. Detector 24 (and also detector 27) may comprise a frequency-to-voltage converter for producing a voltage level as a function of the frequency of the signals supplied thereto.

Detector 24 is coupled to an adder circuit 25, the output of which is coupled, via an amplifier 26, to a supply reel drive motor 21. Likewise, detector 27 is coupled to an adder 28, the output of this adder being coupled, via an amplifier 29, to a take-up reel drive motor 22. It will be appreciated, therefore, that the tension signal produced by detector 24 is used to control the operation of motor 21 so as to correspondingly control the rotation of supply reel 1. Similarly, the tension signal produced by detector 27 serves to control the operation of motor 22 so as to control the rotation of take-up reel 2. If motor 21 drives supply reel 1 at a rate which provides a drag on tape T, the magnitude of this drag is, at least in part determinative of the tape supply tension sensed by roller 12 and detected by detector 24. In a similar fashion, if motor 22 drives take-up reel 2 at a sufficiently high rate, the tension imparted thereby to the tape is sensed by roller 17 and detected by detector 27. A slackening of the tape so as to reduce the supply or take-up tension is detected by detector 24 and detector 27, whereupon motors 21 and 22 are driven to eliminate such slack and, thus, restore the desired tape tension. For example, the speed of motor 21 may be retarded while the speed of motor 22 may be increased. Alternatively, if the detected tape tension is too large, a slight slackening of the tape may be produced by increasing slightly the speed at which motor 21 is driven and decreasing slightly the speed at which motor 22 is driven.

Adder circuit 25, and also adder circuit 28, are supplied with preset voltages from, for example, control circuit 3. These preset voltages are adapted to cooperate with the detected tape tension to drive motors 21 and 22 at their appropriate speeds. For example, when the proper tension is present in tape T, the tension signal produced by detector 24, when summed with the preset voltage supplied by control circuit 3, serves to drive motor 21 at a rate sufficient to maintain this tension. Likewise, the preset voltage supplied to adder 28, when summed with the tension signal produced by detector 27, is sufficient to drive motor 22 to maintain the proper take-up tension.

In the tape transport system illustrated in FIG. 1, a proper balance between the tape supply and tape take-up tensions is necessary in order to maintain proper friction between the surface of capstan 16 and tape T. This friction is, of course, necessary in order to transport the tape at the proper speed. For example, at a speed equal to 76 cm./sec., a change in the tape supply or tape take-up tensions from their respectively desired values is detected by detectors 24 and 27 and used to feed back respective control voltages to motors 21 and 22 so as to increase or decrease the drag on the tape and, thereby, restore the supply and take-up tensions to their proper, desired values. However, it is possible that, before the proper tape tensions can be restored, an unbalance between the supply and take-up tensions may result in the slackening or loosening of the tape about the peripheral surface of capstan 16. This, in turn, causes the tape to slip with respect to the rotation of the capstan. When tape slippage of this type occurs, a film of air may be produced between the surface of the capstan and the surface of the tape. This air film may remain, notwithstanding a re-balancing of the tape supply and tape take-up tensions. Consequently, in the presence of such an air film, tape slippage remains. This means that, even though the proper tape tension balance is restored, the tape will not be transported at the proper, uniform speed between the supply and take-up reels and, in particular, the tape speed will be in error at the head assembly station 15. Accordingly, the PCM audio signals may be recorded or reproduced with error.

In accordance with one aspect of the present invention, in the event of tape slippage between tape T and capstan 16 in the tape transport system illustrated in FIG. 1, this tape slippage is detected and cancelled. It will be appreciated that, in the embodiment shown in FIG. 1, tape slippage might be detected as a function of the unbalance between the tape supply and tape take-up tensions detected by detectors 24 and 27. However, although the tape tension may be re-balanced, in the manner described above, this will not necessarily eliminate the air film between capstan 16 and tape T, thereby maintaining the tape slippage. In contradistinction to this difficulty, the present invention not only detects tape slippage but corrects for same and, thus, eliminates that slippage by adjusting the preset voltages supplied to adder circuits 25 and 28 by control circuit 3. This adjusting serves to modify the rates at which motors 21 and 22 are driven so as to correspondingly modify the tape supply and tape take-up tensions, thereby eliminating the tape slippage. It will be appreciated that this adjustment in the motor drive signals is over and above the adjustments effected by detectors 24 and 27. Therefore, even if detectors 24 and 27 detect that tape T exhibits proper supply and take-up tensions, if slip is present control circuit 3 functions to detect tape slippage and adjust the drive voltages supplied to motors 21 and 22. These drive voltages may be referred to herein as tension control voltages because they act on the tension of tape T between capstan 16 and the supply and take-up reels, respectively.

Figure 2:
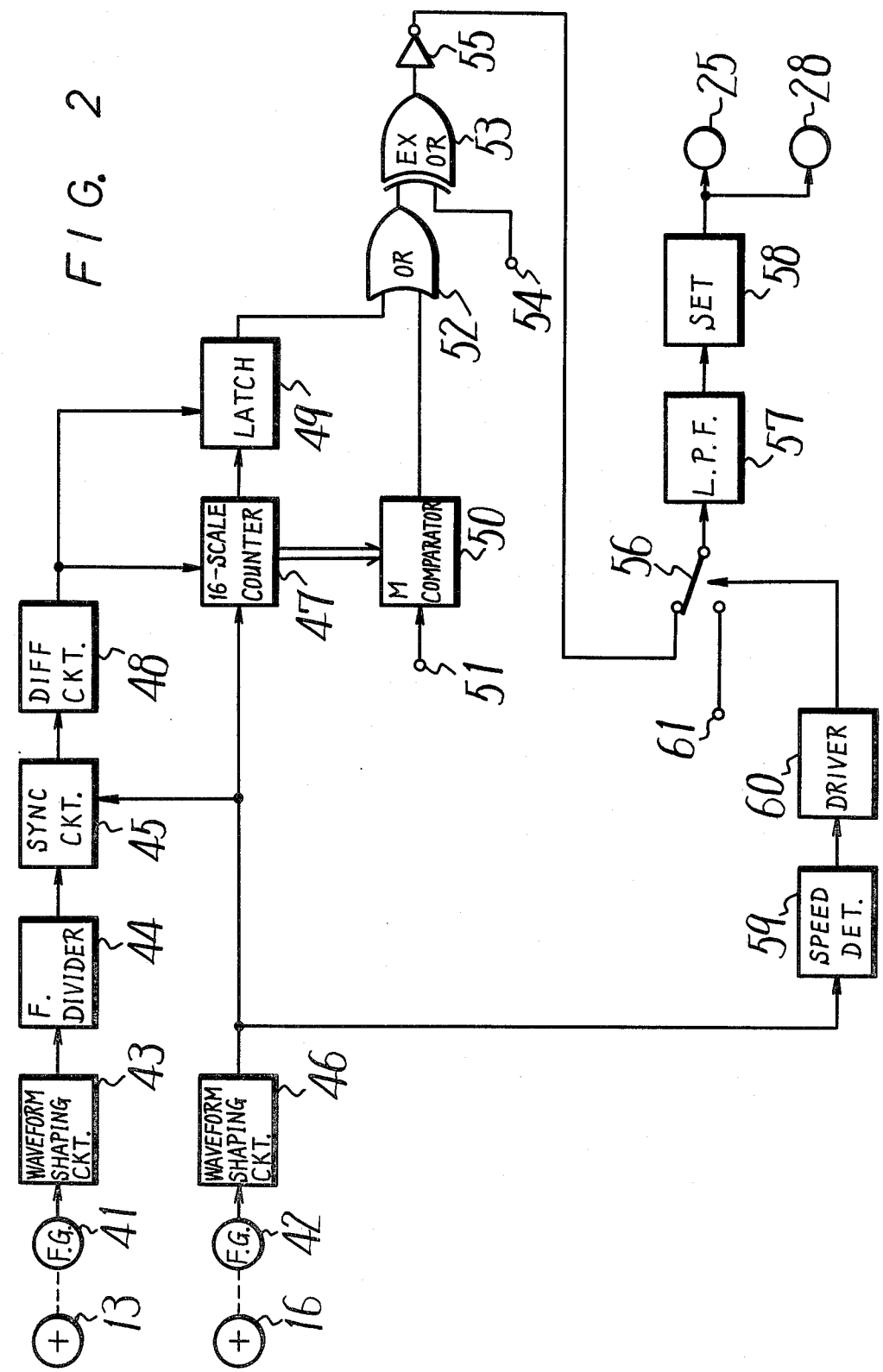
FIG. 2 is a block diagram of one embodiment of the present invention.

Referring now to FIG. 2, there is illustrated a block diagram of one embodiment of the present invention. The apparatus illustrated in FIG. 2 serves to detect the slippage of tape T with respect to capstan 16 and to adjust the tension control voltages supplied to drive motors 21 and 22. Consequently, the illustrated apparatus may be included in control circuit 3 of FIG. 1. This apparatus is comprised of a frequency generator 41 mechanically coupled to roller 13 and a frequency generator 42 mechanically coupled to capstan 16. The broken lines illustrated in FIG. 2 represent this mechanical coupling. As an example, each frequency generator may be comprised of a rotary device, such as a disc having indicia thereon, and an indicia sensing mechanism. As each indicium passes the sensing mechanism, a pulse is produced thereby. The frequency, or pulse repetition rate of these pulses thus is a function of the angular velocity of the disc which, in turn, is a function of the angular velocity of roller 13 or capstan 16 mechanically coupled thereto. The indicia may be optically detectable marks, or slits, and the sensing mechanism may comprise a conventional photodetector. Alternatively, the indicia may comprise magnetic elements, and the sensing mechanism may comprise a suitable magnetic pick-up device. As a numerical example, in the absence of slippage between tape T and capstan 16, when the tape is driven at, for example, 76 cm./sec., frequency generator 41 generates pulses having a pulse repetition rate of 262 Hz; and frequency generator 42 generates pulses having a pulse repetition rate of 2100 Hz. These frequencies exhibit an approximately 8:1 relationship therebetween. If desired, the respective frequencies may exhibit any other suitable integer. The purpose of this relationship between the respective frequencies will be apparent from the ensuing discussion.

Frequency generator 41 is coupled to a frequency divider 44 by a wave shaping circuit 43. The purpose of the wave shaping circuit is to provide the pulses produced by the frequency generator with an accurate pulse waveform. Frequency divider 44 is adapted to divide the frequency of the pulses derived from frequency generator 41 by a factor of 2. Hence, in accordance with the numerical example described above, the frequency of the signal produced at the output of frequency divider 44 is equal to 131 Hz when tape T is driven at 76 cm./sec. in the absence of slip. The frequency-divided pulses produced by frequency divider 44 are supplied to a synchronizing circuit 45 whereat the frequency-divided pulses are synchronized with the higher frequency pulses produced by frequency generator 42. As illustrated, the output of frequency generator 42 is coupled to the synchronizing circuit via a wave shaping circuit 46 which, for example, may be similar to aforementioned wave shaping circuit 43. Synchronizing circuit 45 may comprise, for example, a D-type flip-flop circuit whose D input is coupled to frequency divider 44 and whose timing input T is coupled to wave shaping circuit 46. One of ordinary skill in the art will recognize that such a D-type flip-flop circuit produces an output whose waveform is similar to the waveform supplied to its D input and time-synchronized with the pulses supplied to its T input.

The output of wave shaping circuit 46 also is coupled to a 16-step counter 47. This counter includes a reset terminal coupled to a differentiating circuit 48, the latter being supplied with the synchronized, frequency-divided pulses. Differentiating circuit 48 is adapted to produce relatively narrow pulses in response to the positive transitions of the synchronized, frequency-divided pulses, and to reset counter 47 to a preset count, for example, a count of zero, in response to such pulses. For example, the differentiating circuit may comprise a conventional RC differentiating circuit, a monostable multivibrator triggered by the positive transitions of the synchronized, frequency-divided pulses supplied thereto, or other suitable transition-sensing circuit for producing what is referred to herein as differentiated pulses.

Counter 47 may be of the type adapted to count from its preset count [0000] to its maximum count [1111] and to remain at that maximum count until reset by the differentiated pulses produced by differentiating circuit 48. Of course, if counter 47 has not yet attained its maximum count [1111], it will, nevertheless, be reset to its preset count in response to the differentiated pulse supplied thereto. Counter 47 may be a conventional multistage counter whose most significant bit is coupled to a latch circuit 49. The latch circuit 49 includes a reset terminal coupled to differentiating circuit 48 and is adapted to be reset in response to each differentiated pulse supplied thereto.

Counter 47 also is coupled to a magnitude comparator 50 which is adapted to compare the numerical value of the instantaneous count of the counter to a predetermined count. In particular, the count [0111] is supplied from input terminal 51 to comparator 50; and the comparator is adapted to produce a binary "0" output when the count of counter 47 is less than this predetermined count and to produce a binary "1" output when the count of the counter exceeds this predetermined count. It is appreciated that, since counter 47 is a 16-step counter, the predetermined count to which the count of the counter is compared is substantially one-half the maximum attainable count. It will, therefore, be appreciated that the output produced by comparator 50 is a rectangular waveform whose duty cycle is a function of the relationship between the frequencies produced by frequency generators 41 and 42. In particular, if the frequency of the pulses produced by frequency generator 41 is one-eighth the frequency of the pulses produced by frequency generator 42, then the differentiated pulses produced by differentiating circuit 48 will occur at a rate which is one-sixteenth the frequency produced by frequency generator 42 and, therefore, both the most significant bit produced by counter 47 as well as the output of comparator 50 will exhibit a duty cycle of 50%. However, if the frequency produced by frequency generator 41 decreases, the period between the differentiated pulses produced by differentiating circuit 48 will be greater than the period during which counter 47 is incremented to its maximum count. In that event, both the most significant bit of the count of counter 47 as well as the output of comparator 50 will exhibit a duty cycle that is greater than 50%. Of course, and conversely, if the frequency produced by frequency generator 41 increases, the period between the differentiated pulses produced by differentiating circuit 48 will decrease to be less than the period required for counter 47 to be incremented to its maximum count. Hence, the duty cycle of the most significant of the count of counter 47 and the output of comparator 50 will be less than 50%. Since the frequency produced by frequency generator 41 is a function of the tension of tape T about roller 13, an increase in the duty cycle of the most significant bit produced by counter 47, and also of the output of comparator 50, is an indication of the slippage of tape T with respect to capstan 16. The magnitude of this increase in the duty cycle is a representation of the magnitude of the tape slippage.

The output of comparator 50 and the output of latch circuit 49 are coupled to respective inputs of an OR gate 52. The output of this OR gate is coupled to one input of an exclusive-OR circuit 53, and the other input of this exclusive-OR circuit is coupled to a terminal 54. This terminal is supplied with a signal representing the direction in which tape T is transported. For example, when the tape is transported in the forward direction, a relatively higher voltage level binary "1" is supplied to terminal 54. Conversely, when the tape is transported in the reverse direction, a binary "0" is supplied thereto. Thus, when the tape is transported in the forward direction, exclusive-OR circuit 53 serves to invert the output of OR gate 52. A logical inverter 55 is coupled to the output of exclusive-OR circuit 53. It will be appreciated, from the discussions below, that the exclusive-OR circuit is useful in adjusting the tension control voltage notwithstanding the direction in which the tape is transported.

The output of inverter 55 is coupled, via a change-over switch 56, to a low pass filter 57. This low pass filter serves to produce a DC level as a function of the duty cycle of the signals supplied thereto. The output of filter 57 is coupled to a level setting circuit 58, the output of which being supplied to adder circuits 25 and 28, respectively. It will be seen that, as the DC level produced by low pass filter 57 increases, level setting circuit 58 produces a corresponding output voltage of negative polarity.

Wave shaping circuit 46 also is coupled to a speed detector circuit 59. The purpose of the speed detector circuit is to detect when capstan 16 is driven at less than its normal speed so as to transport tape T at a velocity less than 76 cm./sec. In one embodiment, speed detector circuit 59 comprises a retriggerable monostable multivibrator whose time constant is selected such that, when capstan 16 is driven at its normal angular velocity, the monostable multivibrator remains in its quasi-stable state. However, when the speed of capstan 16 decreases, the period between adjacent pulses produced by frequency generator 42 increases, thereby allowing the monostable multivibrator to "time out" and return to its stable state. In this fashion, speed detector circuit 59 detects when capstan 16 is driven at less than normal speed. The output of the speed detector circuit is coupled to change-over switch driver 60, the latter being, for example, a relay driver. When speed detector circuit 59 detects the capstan 16 is driven at or above normal speed, driver 16 operates change-over switch 56 such that the switch exhibits the condition illustrated in FIG. 2. However, when the speed detector circuit detects that capstan 16 is driven at less than normal speed, driver 60 operates change-over switch 56 so as to change over and couple terminal 61 to low pass filter 57. Terminal 61 is supplied with a reference voltage which, for example, is equal to the voltage produced by low pass filter 57 when the latter is supplied with a rectangular waveform whose duty cycle is equal to 50%. The purpose for change-over switch 56 will be explained below.

Figure 3A:
Figure 3B:
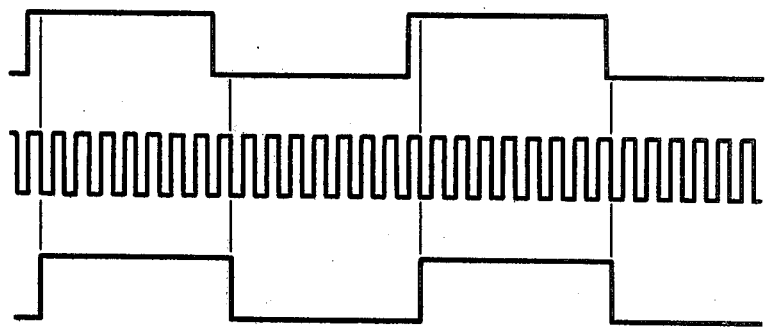
Figure 3C:

The manner in which the apparatus illustrated in FIG. 2 operates now will be described. Let it be assumed that tape T is driven by capstan 16 without slip. Accordingly, the angular velocity of roller 13 is such that frequency divider 44 produces the pulses illustrated in FIG. 3A, having the pulse repetition rate of 131 Hz. Capstan 16 is driven to transport the tape at the normal rate of, for example 76 cm./sec., resulting in the production of pulses by wave shaping circuit 46 as illustrated in FIG. 3B. Synchronizing circuit 45 is responsive to, for example, the negative transitions in the pulses shown in FIG. 3B so as to synchronize the frequency-divided pulses (FIG. 3A) in the manner illustrated in FIG. 3C. It is seen that, in the absence of tape slip, the frequency of the synchronized, frequency-divided pulses of FIG. 3C is equal to one-sixteenth the frequency of the pulses of FIG. 3B.

Figure 3D:
Figure 3E:
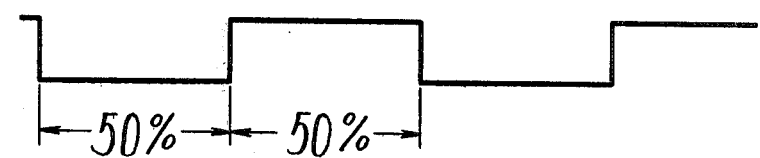

Differentiating circuit 48 responds to the positive transition of the synchronized, frequency-divided pulses (FIG. 3C) to produce the differentiated pulses illustrated in FIG. 3D. Each of the pulses shown in FIG. 3D resets counter 47, thereby enabling the counter to count the pulses of FIG. 3B. FIG. 3E represents the counter of counter 47, as incremented by each of the pulses shown in FIG. 3B. It is appreciated that the counter is incremented from its preset count of zero to its maximum count of 15. For convenience, FIG. 3E depicts the incrementing count of counter 47 from its preset count of zero to a count of 9 and, thereafter, the counter continues to be incremented to the counts of A, B, C, D, E and F which, it is recognized, correspond to the counts of 10, 11, 12, 13, 14 and 15, respectively. After counter 47 is incremented to the count of 15 (F), the next-following differentiated pulse (FIG. 3D) resets the counter to its preset count of 0. The counter then is incremented once again.

Figure 3F:
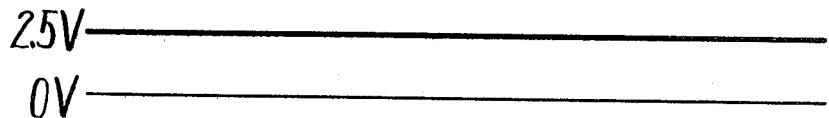

The frequency of the differentiated pulses of FIG. 3D is one-sixteenth the frequency of the pulses shown in FIG. 3B. Therefore, the logic state of the most significant bit produced by counter 47 is equal to a binary "0" for the counts 0 to 7 and then changes over to a binary "1" from the counts 8 to 15. As shown in FIG. 3F, the waveform representation of this most significant bit is a rectangular wave having a duty cycle equal to 50%.

Similarly, if the instantaneous count of counter 47 is compared to the digital representation [0111], or "7", the count will be less than this digital representation for one-half of its count and then will exceed this digital representation for the next-following half. The output of comparator 50 thus may be illustrated as the rectangular waveform shown in FIG. 3F having a duty cycle of 50%.

The rectangular waveform shown in FIG. 3F, which may be derived from the most significant bit produced by counter 47 or from the output of comparator 50, is supplied via OR gate 52, exclusive-OR circuit 53 and inverter 55 to low pass filter 57. In the present example, it is assumed that tape T is transported in the forward direction, whereby exclusive-OR circuit 53 functions to invert the waveform shown in FIG. 3F; and inverter 55 restores this waveform. Low pass filter 57 responds to the rectangular waveform having a 50% duty cycle to produce a DC level equal to, for example, 2.5 volts, as shown in FIG. 3G. This DC level, when supplied to level setting circuit 58, results in a voltage of, for example, zero volts supplied to adder circuits 25 and 28, as illustrated in FIG. 3H. Hence, in accordance with the foregoing example, when tape T is transported without slippage, the frequencies of the pulses produced by frequency generators 41 and 42 exhibit the ratio 1:8 which results in the production of a rectangular waveform having a duty cycle of 50% supplied to low pass filter 57. Thid duty cycle of 50% results, in turn, in a voltage at the output of level setting circuit 58 equal to zero volts. Thus, the motor drive voltages supplied to motors 21 and 22 from adder circuits 25 and 28 are not adjusted. The tension in tape T thus remains as is.

Figure 4A:
FIGS. 4A-4H are waveform diagrams which are useful in understanding the operation of the embodiment shown in FIG. 2 in which tape slippage is corrected.
Figure 4B:

Let it now be assumed that slippage occurs between tape T and capstan 16. Because of this tape slip, it will be recognized that roller 13 now is driven at an angular velocity which is less than the angular velocity exhibited in the absence of the slip. Consequently, the frequency of the pulses produced by frequency generator 41 now is less than the aforedescribed example of 262 Hz. Therefore, the frequencies of the pulses produced by frequency generators 41 and 42 now exhibit a ratio that is greater than 1:8. As before, the frequency of the pulses produced by frequency generator 41 is divided by one-half by frequency divider 44. The frequency-divided pulses produced by the frequency divider are illustrated in FIG. 4A; and the wave-shaped pulses derived from frequency generator 42 are illustrated in FIG. 4B. As before, the frequency-divided pulses are synchronized in synchronizing circuit 45 with the pulses derived from frequency generator 42, thus resulting in the synchronized, frequency-divided pulses shown in FIG. 4C. It will be seen that the period of the synchronized, frequency-divided pulses now is greater than the period occupied by sixteen of the pulses produced by frequency generator 42. This, of course, is due to the fact that roller 13 now rotates at a lesser angular velocity than before.

Figure 4C:
Figure 4D:
Figure 4E:

Differentiating circuit 48 responds to the positive transitions of the pulses shown in FIG. 4C to produce the differentiated pulses of FIG. 4D. Each differentiated pulse serves to reset counter 47 to enable the counter to count the pulses of FIG. 4B.

Figure 4F:
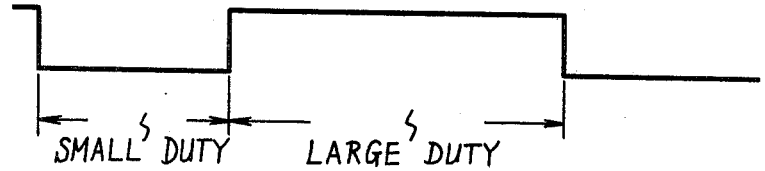
Figure 4G:
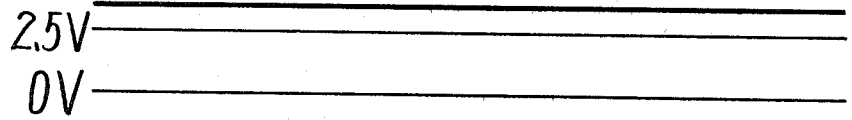
Figure 4H:
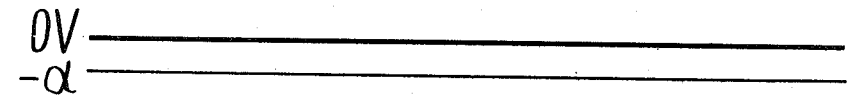

In the example illustrated herein, counter 47 is reset to its preset count of zero, and then counts the pulses of FIG. 4B from its count of zero to its count of F, as before. Now, however, the next-following reset pulse (FIG. 4D) is not produced when the count has been incremented to the count of F. In the example described herein, six additional pulses (FIG. 4D) are generated prior to the occurrence of the next-following reset pulse (FIG. 4D). Thus, the most significant bit produced by counter 47 remains at its binary "1" level during the six additional pulses; and, likewise, comparator 50 produces the binary "1" output during these six additional pulses, both as shown in FIG. 4F. Hence, when tape T slips with respect to capstan 16, the relative angular velocity of roller 13 is reduced so as to increase the duty cycle of the most significant bit of counter 47 and also to increase the duty cycle of the output of comparator 50. The resultant rectangular waveform having the increased duty cycle is supplied via OR gate 52 to low pass filter 57, resulting in an increase in the DC level produced by the filter, as shown in FIG. 4G. This increase in the DC level at the output of low pass filter 57 operates level setting circuit 58 to produce the negative voltage $-\alpha$ shown in FIG. 4H. It will be seen that the magnitude $\alpha$ is a function of the DC level produced by low pass filter 57.

The tension control voltage $-\alpha$ produced by level setting circuit 58 is supplied to adder circuits 25 and 28. This voltage $-\alpha$ adjusts the tension control voltage supplied by the adder circuits to motors 21 and 22, respectively. As a result of this adjustment in the tension control voltages, the speed of motor 21 is retarded slightly and the speed of motor 22 is increased slightly so as to increase the tension in tape T and thereby eliminate the slip between the tape and capstan 16. Once this slip is eliminated, roller 13 is driven at the rate described hereinabove with respect to the waveform diagrams illustrated in FIGS. 3A–3H.

In the foregoing description, it has been assumed that tape T is driven in the forward direction. It is recalled that a binary "1" signal is suppled to terminal 54 when the tape is driven in this forward direction; and a binary "0" signal is supplied thereto when the tape is driven in the reverse direction. The binary "1" applied to exclusive-OR circuit 53 and representative of the forward tape drive direction serves to invert the output supplied thereto from OR gate 52. However, when the tape is driven in the reverse direction, the binary "0" applied to exclusive-OR circuit 53 enables the exclusive-OR circuit to pass the very same signal which is supplied thereto from OR gate 52. For reverse tape motion, inverter 55 inverts the rectangular waveform signal produced at the output of OR gate 52 such that, when tape slip is present so as to increase the duty cycle of this rectangular waveform, inverter 55 supplies a rectangular waveform signal of reduced duty cycle to low pass filter 57. Consequently, when tape T is driven in the reverse direction and slip is present between the tape and capstan 16, low pass filter 57 produces a DC level that is less than the aforementioned 2.5 volt magnitude. As a result thereof, level setting circuit 58 generates a positive tension control voltage on the order of, for example, $+\alpha$. This tension control voltage $+\alpha$ is supplied to adder circuits 25 and 28 and thence to reel drive motors 21 and 22, respectively.

It is, therefore, appreciated that when the tape is driven in the forward direction, tape slip is detected and represented by an increase in the duty cycle of the signal supplied to low pass filter 57; thereby resulting in an adjustment in the tension control voltage of $-\alpha$. This adjustment, or change, in the tension control voltage tends to retard the rotation of supply reel drive motor 21 and to increase the rotation of take-up reel drive motor 22. However, when the tape is driven in the reverse direction, tape slippage is represented by a reduction in the duty cycle of the signal supplied to low pass filter 57; thereby resulting in an adjustment to the tension control voltage on the order of about $+\alpha$. This change in the tension control voltage tends to increase the rotation of supply reel drive motor 21 and descrease the rotation of take-up reel drive motor 22, thereby restoring the proper tension to the tape.

It is appreciated that the frequency of the rectangular waveform signal supplied to low pass filter 57 is a function of the frequency of the pulses generated by frequency generator 41. This, in turn, is a function of the speed at which tape T is driven. If, for example, the tape is driven at a relatively low speed, such as must less than the normal tape drive speed of 76 cm./sec., the frequency of the rectangular waveform signal supplied to low pass filter 57 may be well below the cut-off frequency of that filter. Consequently, the low frequency rectangular waveform signal will pass through this filter, thereby resulting in a corresponding fluctuation in the tension control voltage generated by level setting circuit 58. This, in turn, tends to increase and decrease the tape tension. Even if no tape slip is present, the low frequency rectangular waveform signal having a duty cycle equal to 50% still will result in the aforementioned fluctuation of the tension control voltage.

To avoid such a fluctuation in the tension control voltage due to low tape transport speeds, change-over switch 56 is changed over from the position illustrated in FIG. 2 so as to couple input terminal 61 to low pass filter 57. Speed detector circuit 59, described above, functions to detect when capstan 16 is driven at a low speed so as to change over switch 56. Therefore, even if the tape is intended to be transported at a low speed, the fact that the reference voltage of, for example, 2.5 volts is supplied to low pass filter 57 from input terminal 61 prevents level setting circuit 58 from generating a fluctuating tension control voltage. As one example thereof, change-over switch 56 may comprise a relay switch including a relay coil coupled to driver 60. When speed detector circuit 59 detects the relatively low tape transport speed, driver 60 is actuated to energize the relay coil and, thus, change over the relay switch so as to supply the 2.5 volt reference voltage to low pass filter 57.

It will be recognized by those of ordinary skill in the art that there is a very low probability of tape slippage when the tape is transported at low speeds. Thus, when speed detector circuit 59 detects such low tape transport speeds, there is no need to adjust the tape tension in order to eliminate tape slippage. For this reason, it is appropriate to supply the constant reference voltage of 2.5 volts through low pass filter 57 to level setting circuit 58 when the tape is transported at low tape speeds.

As an alternative to the embodiment shown in FIG. 2, when speed detector circuit 59 detects that tape T is transported at relatively low speeds, the operation of level setting circuit 58 may be inhibited. As a further alternative, change-over switch 56 may be coupled to the output of level setting circuit 58 so as to supply a reference voltage to adder circuits 25 and 28 when relatively low tape transport speeds are detected. It is sufficient to inhibit adjustments in the tension control voltage by level setting circuit 58 when speed detector circuit 59 detects that the tape is transported at, for example, less than the normal tape transport speed.

The apparatus illustrated in FIG. 2 also operates to prevent errors during start-up of the tape transport system. For example, and as shown in FIG. 1, roller 11 may impart a relatively high tape supply tension to the tape when tape movement first is initiated. This high tape supply tension may cause substantial tape slippage between tape T and capstan 16. However, the apparatus illustrated in FIG. 2 and described hereinabove operates to compensate for this tape tension and, more particularly, level setting circuit 58 is controlled so as to reduce the tape supply tension and to increase the tape take-up tension. This, in turn, reduces and eliminates the tape slip between the tape and the capstan. Consequently, even during start-up of the tape transport system, the tape will be transported correctly.

Figure 5:
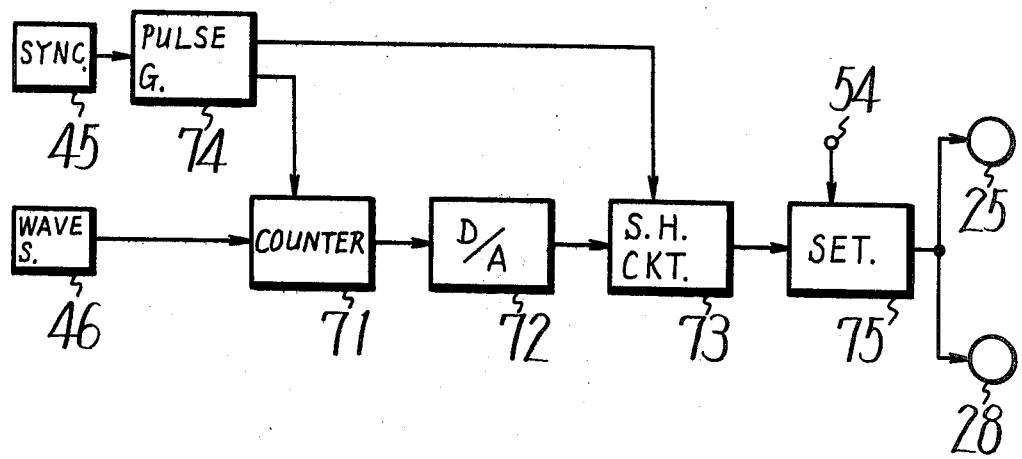
FIG. 5 is a block diagram of another embodiment of the present invention.

Another embodiment of the present invention is illustrated in FIG. 5. As shown herein, the output of synchronizing circuit 45, described above with respect to FIG. 2, is coupled to a pulse generator 74. Also, the output of wave shaping circuit 46, described above with respect to FIG. 2, is coupled to a digital counter 71. Pulse generator 74 is adapted to generate reset pulses in response to the synchronizing pulses produced by synchronizing circuit 45. These reset pulses are supplied to counter 71 to reset the count thereof to a preset count, such as a count of zero. Counter 71 functions to count the pulses supplied thereto by wave shaping circuit 46. In this regard, counter 71 differs from counter 47 in that it is not inhibited from counting beyond a maximum count of 16.

The output of counter 71 is coupled to a digital-to-analog (D/A) converter 72; and this D/A converter is, in turn, coupled to sample-and-hold circuit 73. Pulse generator 74 is adapted to supply sampling pulses to the sample-and-hold circuit in response to the synchronizing pulses supplied thereto from synchronizing circuit 45. The output of sample-and-hold circuit 73 is coupled to level setting circuit 75.

The operation of the embodiment shown in FIG. 5 will best be understood by referring to the waveform diagrams of FIGS. 6A–6E. Let it be assumed that tape slip is present. Accordingly, wave shaping circuit 46 produces pulses of the type shown in FIG. 4B; and synchronizing circuit 45 produces pulses of type shown in FIG. 4C. Let it be further assumed that the period between the synchronizing pulses is increasing because of the tape slip.

Figure 6A:
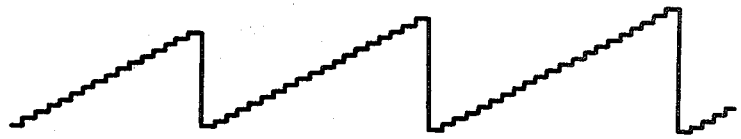
FIGS. 6A-6E are waveform diagrams which are useful in understanding the operation of the embodiment shown in FIG. 5.
Figure 6B:
Figure 6C:

Pulse generator 74 may comprise, for example, monostable multivibrator circuits for generating reset pulses (FIG. 6B) and sampling pulses (FIG. 6C). The monostable multivibrator circuits may be triggered by each synchronizing pulse (FIG. 4C) to produce the illustrated reset and sampling pulses. Alternatively, pulse generator 74 may include differentiating circuits for differentiating the positive transitions in the synchronizing pulses, thereby producing the illustrated reset and sampling pulses. Each reset pulse (FIG. 6B) serves to reset counter 71. Once reset, the count of counter 71 is incremented in response to each pulse supplied thereto from wave shaping circuit 46 (FIG. 4B).

As the count of counter 71 is incremented, D/A converter 72 converts this increasing count to a corresponding voltage level. Accordingly, D/A converter 72 produces the staircase waveform signal illustrated in FIG. 6A. It is appreciated that, as the period of the synchronizing pulses increases, the period of the reset pulses correspondingly increases so as to enable counter 71 to reach higher counts before being reset. This, in turn, results in a staircase voltage waveform which reaches higher magnitudes, as shown in FIG. 6A.

Figure 6D:
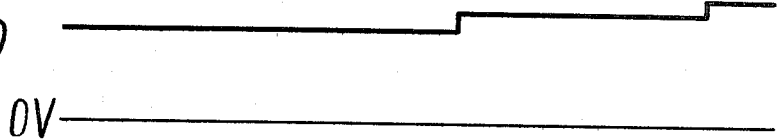
Figure 6E:

Sample-and-hold circuit 73 samples the voltage magnitude of each staircase waveform signal produced by D/A converter 72 in response to each sampling pulse (FIG. 6C) supplied thereto from pulse generator 74. As shown in FIG. 6D, as the staircase wavefrom reaches higher magnitudes, the sampled voltage level likewise reaches higher magnitudes. Thus, as the tape slip increases, the sample voltage produced by sample-and-hold circuit 73 also increases. This sampled voltage is supplied to level setting circuit 75 to produce a corresponding tension control voltage, as illustrated in FIG. 6E. It is appreciated that level setting circuit 75 may be similar to aforedescribed level setting circuit 58.

In the FIG. 5 embodiment, level setting circuit 75 also is coupled to input terminal 54 to receive a tape direction indicating signal. This tape direction indicating signal serves to reverse the polarity of the tension control voltage generated by level setting circuit 75 when tape T is driven in the reverse direction. For example, the level setting circuit may produce a tension control voltage of negative polarity when a binary "1" signal representing the forward tape direction is supplied to terminal 54; and the level setting circuit may produce a tension control voltage of positive polarity when a binary "0" signal representing reverse tape movement is supplied to terminal 54.

From the foregoing description, it will be appreciated that level setting circuit 75 tends to retard drive motor 21 and to speed up drive motor 22 when tape slippage is detected while tape T is transported in the forward direction. Of course, the magnitude of this tape tension adjustment is a function of the detected tape slippage. Conversely, when tape T is transported in the reverse direction, level setting circuit 75 responds to detected tape slippage to speed up drive motor 21 and to retard drive motor 22. Hence, regardless of the direction in which the tape is transported, the tape tension is controlled so as to minimize and then eliminate slippage between the tape and capstan 16.

A practical implementation of the embodiment illustrated in FIG. 2 is shown in FIG. 7. In this implementation, synchronizing circuit 45 is comprised of D-type flip-flop circuit 81. The D input of this flip-flop circuit is coupled to the output of frequency divider 44 (FIG. 2) and the clock input thereof is connected to receive the pulses produced by wave shaping circuit 46. Differentiating circuit 48, which is coupled to the output of synchronizing circuit 45, includes an integrator, inverter and NAND gate interconnected in a manner known to those of ordinary skill in the art to produce output pulses in response to, for example, positive transitions of the synchronized pulses produced by synchronizing circuit 45.

Counter 47 is illustrated in FIG. 7 as comprising a 4-bit binary counter whose most significant bit is coupled to latch circuit 49 which, as illustrated, is comprised of a D-type flip-flop circuit 82. It is appreciated that, when the most significant bit of counter 47 changes over from a binary "0" to a binary "1", flip-flop circuit 82 is triggered to its set state. It also is appreciated that this flip-flop circuit is reset in response to each differentiated pulse produced by differentiating circuit 48.

As also illustrated in FIG. 7, low pass filter 57 may comprise an active low pass filter; and level setting circuit 58 may include an operational amplifier whose inverting input is coupled to the output of active low pass filter 57.

Change-over switch 56 is shown as being coupled to the input of active low pass filter 57 and is controlled by a relay driven by a drive transistor 85, the latter comprising drive circuit 60. As an alternative, change-over switch 56' may be coupled to the output of level setting circuit 58 and adapted, when drive transistor 85 is actuated, to disconnect the level setting circuit from adder circuits 25 and 28.

Finally, FIG. 7 illustrates speed detector circuit 59 as comprising a retriggerable monostable multivibrator 83 whose Q output is coupled to a D-type flip-flop circuit 84. So long as the period between the pulses produced by wave shaping circuit 46 is less than the time-out period of monostable multivibrator 83, the Q output thereof supplies a binary "0" to maintain flip-flop circuit 84 in its reset state. This, in turn, deactuates relay drive transistor 85. However, when the period between the pulses produced by wave shaping circuit 46 increases beyond the time-out period of monostable multivibrator 83, as when the tape is driven at less than its normal speed, the monostable multivibrator returns to its stable state so as to set D-type flip-flop circuit 84. This, in turn, actuates relay drive transistor 85 to energize the relay and change over switch 56.

While the present invention has been particularly shown and described with reference to certain preferred embodiments, it will be readily appreciated by those of ordinary skill in the art that various changes and modifications in form and details may be made without departing from the spirit and scope of the invention. For example, some of the digital circuits may be replaced by comparable analog circuitry. Also, the particular implementation shown in FIG. 7 may be modified, as desired. Counter 47, for example, may be of the type capable of being incremented to a much higher count than merely a count of 16. Although it is preferred that comparator 50 be adapted to sense when the count of counter 47 exceeds its mid-count, the comparator may operate to sense when the counter exceeds any other predetermined count, as may be desired.

It is, therefore, intended that the appended claims be interpreted as including the foregoing as well as various other changes and modifications.

What is claimed is:

1. Apparatus for controlling a web transport system of the type having supply and take-up reels for supplying and taking up said web, respectively, tension control means for controlling the supply and take-up tension of said web, web drive means operatively driven for moving said web, and sense means for sensing the movement of said web, said apparatus comprising web drive detecting means for detecting the operation of said web drive means; comparator means coupled to said sense means and said web drive detecting means for comparing the movement of said web and the operation of said web drive means to indicate when said web moves at a rate different from the rate at which said web drive means is driven; and adjusting means coupled to said comparator means for adjusting said tension control means when said web moves at a rate different from the operating rate of said web drive means.

2. The apparatus of claim 1 wherein said sense means is operative to produce a first signal having a frequency determined by the rate at which said web moves; said web drive detecting means is operative to produce a second signal having a frequency determined by the rate at which said web drive means is driven; and said comparator means comprises counter means responsive to said first and second signals to produce a count, digital-to-analog converting means for converting the count of said counter means to an analog signal, and sampling means responsive to said first signal for sampling said analog signal to produce an indicating signal representing the difference, if any, between the rate at which said web moves and the rate at which said web drive means is driven.

3. The apparatus of claim 2 wherein said frequency of said first signal is reduced when said web slips with respect to said web drive means.

4. The apparatus of claim 1 wherein said web is a magnetic tape.

5. The apparatus of claim 4 wherein said web drive means includes a capstan and a capstan motor for rotating said capstan at a substantially constant, predetermined rate.

6. The apparatus of claim 5 wherein said sense means comprises roller means engaged and rotatable by said tape; and rotation indicating means for producing a signal representing the rate of rotation of said roller means.

7. The apparatus of claim 6 wherein said web drive detecting means comprises second rotation indicating means coupled to said capstan for producing a second signal representing the rate of rotation of said capstan.

8. The apparatus of claim 1 wherein said sense means is operative to produce a first signal having a frequency determined by the rate at which said web moves; said web drive detecting means is operative to produce a second signal having a frequency determined by the rate at which said web drive means is driven; and said comparator means comprises counter means responsive to said first and second signals to produce a count, and count sensing means for sensing when the count of said counter means is below and above a preset count, thereby producing an indicating signal having a duty cycle representing the difference, if any, between the rate at which said web moves and the rate at which said web drive means is driven.

9. The apparatus of claim 8 wherein said duty cycle is a predetermined amount when said web moves at the same rate as said web drive means is driven.

10. The apparatus of claim 8 wherein said adjusting means comprises means for adjusting said tension control means as a function of the duty cycle of said indicating signal.

11. The apparatus of claim 8 wherein said counter means is a multi-stage digital counter and said count sensing means is coupled to a predetermined stage of said counter to sense change overs in the state of the logical signal produced by said predetermined stage.

12. The apparatus of claim 11 wherein said predetermined stage is the most significant stage of said counter.

13. The apparatus of claim 8 wherein said count sensing means comprises a digital comparator, a source of fixed digital signal coupled to said digital comparator for supplying thereto a digital number representing said preset count, and said digital comparator is coupled to said source and to said counter means for producing said indicating signal.

14. The apparatus of claim 13 wherein said preset count is approximately one-half the maximum count reached by said counter means.

15. A tape transport system comprising supply and take-up reels; a tape movable along a path between said supply and take-up reels; a capstan disposed in said path for driving said tape; a capstan motor coupled to said capstan for driving said capstan at a substantially constant rate; supply and take-up reel drive motors for driving said supply and take-up reels, respectively; detector means for detecting supply and take-up tape tension in said path between said supply reel and said capstan and between said take-up reel and said capstan, respectively, and for controllably driving said supply and take-up reel drive motors in response thereto; roller means disposed in said path and driven by the movement of said tape; capstan speed signal generating means coupled to said capstan for generating a capstan speed signal representing the speed at which said capstan is driven; tape speed signal generating means coupled to said roller means for generating a tape speed signal representing the speed at which said tape moves; comparator means for comparing said tape and capstan speed signals to produce an error signal when the ratio between said tape and capstan speed signals differs from a predetermined amount; and adjusting means coupled to said comparator means for adjusting the drive of said supply and take-up reel drive motors in response to said error signal.

16. The system of claim 15 wherein each of said capstan and tape speed signal generating means comprises frequency generating means for generating a signal whose frequency represents speed.

17. The system of claim 16 wherein the frequency of said tape speed signal is substantially equal to a predetermined sub-multiple of the frequency of said capstan speed signal when said tape is transported without slip; and wherein said comparator means includes counter means incremented by said capstan speed signal and reset by said tape speed signal; and count detecting means for detecting the count of said counter means to produce said error signal.

18. The system of claim 17 wherein said count detecting means comprises sampling means responsive to said tape speed signal for sampling the count of said counter means and for producing an analog error signal level corresponding to said sampled count.

19. The system of claim 17 wherein said count detecting means comprises means coupled to said counter means for detecting when a predetermined bit of the count of said counter means changes over from one logical state to another to produce an error signal whose duty cycle represents the ratio between the frequencies of said tape and capstan speed signals.

20. The system of claim 19 wherein said counter means is operative to be incremented to a maximum count and to hold said maximum count until reset by said tape speed signal; and said predetermined bit of said count is the most significant bit thereof.

21. The system of claim 17 wherein said count detecting means comprises a digital comparator coupled to said counter means and supplied with a predetermined count for detecting when the count of said counter means is less than and greater than said predetermined count to produce an error signal whose duty cycle represents the ratio between the frequencies of said tape and capstan speed signals.

22. The system of claim 21 wherein said counter means is operative to be incremented to a maximum count and to hold said maximum count until reset by said tape speed signals; and said predetermined count is approximately one-half said maximum count.

23. Apparatus for controlling a web transport system of the type having supply and take-up reels for supplying and taking up said web, respectively, tension control means for controlling the supply and take-up tension of said web, web drive means operatively driven for moving said web, and sense means for sensing the movement of said web and operative to produce a first signal having a frequency determined by the rate at which said web moves; said apparatus comprising web drive detecting means for detecting the operation of said web drive means and operative to produce a second signal having a frequency determined by the rate at which said web drive means is driven; comparator means comprising counter means responsive to said first and second signals to produce a count, and count sensing means for sensing when the count of said counter means is below and above a preset count, thereby producing an indicating signal having a duty cycle representing the difference, if any, between the rate at which said web moves and the rate at which said web drive means is driven; and adjusting means coupled to said comparator means for adjusting said tension control means as a function of the duty cycle of said indicating signal when said web moves at a rate different from the operating rate of said web drive means, said adjusting means comprising low-pass filter means for filtering said indicating signal to produce a DC signal, and tension voltage generating means for generating tension voltages as a function of said DC signal.

24. Apparatus for controlling a web transport system of the type having supply and take-up reels for supplying and taking up said web, respectively, tension control means for controlling the supply and take-up tension of said web, web drive means operatively driven for moving said web, and sense means for sensing the movement of said web, said apparatus comprising web drive detecting means for detecting the operation of said web drive means; comparator means coupled to said sense means and said web drive detecting means for comparing the movement of said web and the operation of said web drive means to indicate when said web moves at a rate different from the rate at which said web drive means is driven; adjusting means coupled to said comparator means for adjusting said tension control means when said web moves at a rate different from the operating rate of said web drive means; and speed detecting means coupled to said web drive means for detecting when said web drive means is driven at less than a predetermined rate, and inhibit means responsive to said speed detecting means for inhibiting said adjusting means from adjusting said tension control means.

25. A tape transport system comprising supply and take-up reels; a tape movable along a path between said supply and take-up reels; a capstan disposed in said path for driving said tape; a capstan motor coupled to said capstan for driving said capstan at a substantially constant rate; supply and take-up reel drive motors for driving said supply and take-up reels, respectively; detector means for detecting supply and take-up tape tension in said path between said supply reel and said capstan and between said take-up reel and said capstan, respectively, and for controllably driving said supply and take-up reel drive motors in response thereto; roller means disposed in said path and driven by the movement of said tape; capstan speed signal generating means coupled to said capstan and including capstan frequency generating means for generating a capstan speed signal whose frequency represents the speed at which said capstan is driven; tape speed signal generating means coupled to said roller means and including tape frequency generating means for generating a tape speed signal whose frequency represents the speed at which said tape moves, said frequency of said tape speed signal being substantially equal to a predetermined sub-multiple of said frequency of said capstan speed signal when said tape is transported without slip; comparator means for comparing said tape and capstan speed signals to produce an error signal when the ratio between said tape and capstan speed signals differs from a predetermined amount, said comparator means including counter means incremented by said capstan speed signal and reset by said tape speed signal, and count detecting means for detecting the count of said counter means to produce said error signal; adjusting means coupled to said comparator means for adjusting the drive of said supply and take-up reel drive motors in response to said error signal; and capstan speed detecting means for detecting when the frequency of said capstan speed signal is less than a predetermined amount; and means responsive to said capstan speed detecting means for selectively inhibiting said adjusting means from responding to said error signal in adjusting the drive of said supply and take-up reel drive motors.

* * * * *